(12) United States Patent
Wachtfogel et al.

(10) Patent No.: US 12,028,548 B2
(45) Date of Patent: Jul. 2, 2024

(54) RENDERING VIDEO FRAMES FOR A USER INTERFACE OPERATION PERFORMED AT A CLIENT DEVICE

(71) Applicant: Synamedia Limited, Staines Upon Thames (GB)

(72) Inventors: Zorach Reuven Wachtfogel, Elazar (IL); Elyashiv Zalevsky, Tzur Hadassah (IL); Anthony Leigh, Workingham (GB); Peter Benjamin Matthews, Basingstoke (GB)

(73) Assignee: Synamedia Limited, Staines Upon Thames (GB)

( * ) Notice: Subject to any disclaimer, the term of this patent is extended or adjusted under 35 U.S.C. 154(b) by 75 days.

(21) Appl. No.: 17/233,909

(22) Filed: Apr. 19, 2021

(65) Prior Publication Data

US 2022/0337868 A1 Oct. 20, 2022

(51) Int. Cl.
*H04N 19/146* (2014.01)
*H04N 5/783* (2006.01)
(Continued)

(52) U.S. Cl.
CPC ........... *H04N 19/567* (2014.11); *H04N 5/783* (2013.01); *H04N 19/146* (2014.11);
(Continued)

(58) Field of Classification Search
CPC .. H04N 19/567; H04N 19/146; H04N 19/172; H04N 19/176; H04N 5/783; H04N 21/2343; H04N 21/2387; H04N 21/2405
(Continued)

(56) References Cited

U.S. PATENT DOCUMENTS 7,587,454 B2 9/2009 Shabtai et al.
9,900,359 B2 2/2018 Sharma et al.
(Continued)

FOREIGN PATENT DOCUMENTS

WO 2018231578 A1 12/2018

OTHER PUBLICATIONS

Combined Search and Examination Report under Sections 17 and 18(3) dated Dec. 8, 2022, Great Britain Application No. GB2208182.2, pp. 1-6.
(Continued)

*Primary Examiner* — Andrea C Leggett
(74) *Attorney, Agent, or Firm* — Fernando & Partners, LLP

(57) ABSTRACT

In some implementations, a device includes one or more processors and a non-transitory memory. In some implementations, a method includes obtaining a request for a sequence of video frames that corresponds to a user interface operation being performed at a client device. In some implementations, the sequence of video frames is to be presented at the client device at a first frame rate. In some implementations, the method includes determining an availability of computing resources associated with providing the sequence of video frames to the client device. In some implementations, the method includes generating, based on the availability of computing resources, the sequence of video frames at a second frame rate that is greater than the first frame rate. In some implementations, the method includes triggering the client device to present the sequence of video frames at the first frame rate.

20 Claims, 7 Drawing Sheets

(51) Int. Cl.
*H04N 19/172* (2014.01)
*H04N 19/176* (2014.01)
*H04N 19/567* (2014.01)
*H04N 21/232* (2011.01)
*H04N 21/2343* (2011.01)
*H04N 21/2387* (2011.01)
*H04N 21/24* (2011.01)
*H04N 21/2662* (2011.01)
*H04N 21/472* (2011.01)
*H04N 21/658* (2011.01)
*H04N 21/6587* (2011.01)

(52) U.S. Cl.
CPC ......... *H04N 19/172* (2014.11); *H04N 19/176* (2014.11); *H04N 21/2323* (2013.01); *H04N 21/2343* (2013.01); *H04N 21/2387* (2013.01); *H04N 21/2402* (2013.01); *H04N 21/2405* (2013.01); *H04N 21/2662* (2013.01); *H04N 21/47217* (2013.01); *H04N 21/6582* (2013.01); *H04N 21/6587* (2013.01)

(58) Field of Classification Search
USPC .......................................................... 715/700
See application file for complete search history.

(56) References Cited

U.S. PATENT DOCUMENTS

| | | | |
|---|---|---|---|
| 11,223,873 B1* | 1/2022 | Keifer, III | H04N 21/6332 |
| 2009/0309885 A1 | 12/2009 | Samson et al. | |
| 2012/0016993 A1 | 1/2012 | Kisel et al. | |
| 2012/0271948 A1 | 10/2012 | Martin | |
| 2015/0012661 A1 | 1/2015 | Elmore | |
| 2017/0315869 A1* | 11/2017 | Rungta | G06F 3/067 |
| 2021/0185384 A1* | 6/2021 | Raikar | H04N 21/8455 |

OTHER PUBLICATIONS

Extended European Search Report for corresponding European Application No. 22176887.2 dated Feb. 27, 2023.
Examination Report for corresponding GB Appl. No. 2208182.2 dated Aug. 4, 2023.

* cited by examiner

RENDERING VIDEO FRAMES FOR A USER INTERFACE OPERATION PERFORMED AT A CLIENT DEVICE

TECHNICAL FIELD

The present disclosure generally relates to rendering video frames for a user interface operation performed at a client device.

BACKGROUND

Some devices are capable of presenting a graphical user interface (GUI) that includes various affordances. While a device is presenting the GUI, a user of the device may provide a user input that corresponds to a request to perform a user interface operation. Displaying a manipulation of the GUI in response to the user input is a resource-intensive operation.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
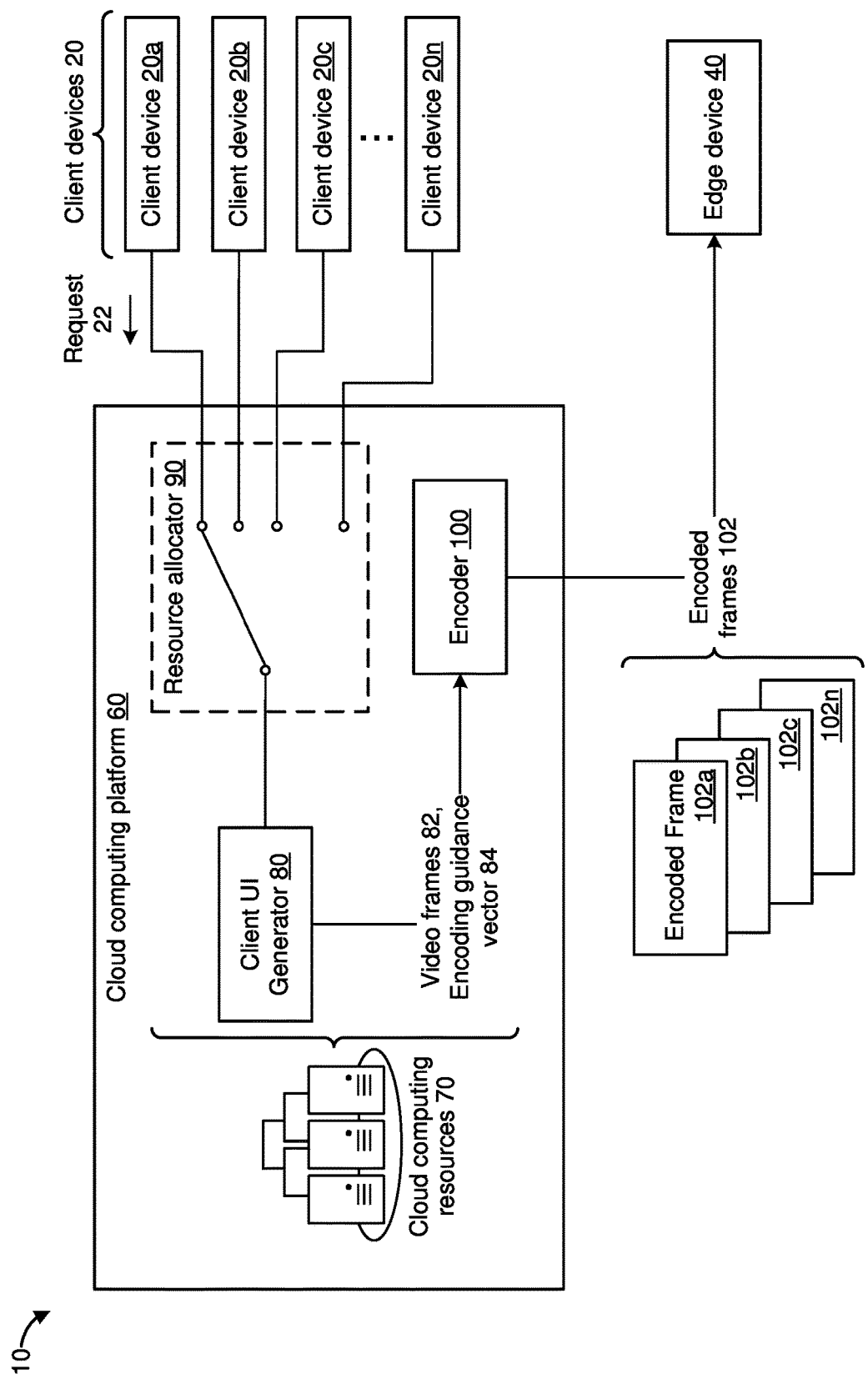
FIGS. 1A-1D are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.
Overview Various implementations disclosed herein include devices, systems, and methods for generating a sequence of video frames for a client device. In some implementations, a device includes one or more processors and a non-transitory memory. In some implementations, a method includes obtaining a request for a sequence of video frames that corresponds to a user interface operation being performed at a client device. In some implementations, the sequence of video frames is to be presented at the client device at a first frame rate. In some implementations, the method includes determining an availability of computing resources associated with providing the sequence of video frames to the client device. In some implementations, the method includes generating, based on the availability of computing resources, the sequence of video frames at a second frame rate that is greater than the first frame rate. In some implementations, the method includes triggering the client device to present the sequence of video frames at the first frame rate.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

EXAMPLE EMBODIMENTS

A resource-constrained client device may not have sufficient computing resources to generate video frames for a user interface operation being performed at the client device. As such, the client device provides an indication of the user interface operation to another device (e.g., an edge device, a server and/or a cloud computing platform) that generates the video frames and transmits the generated video frames to the client device. Since the device generating the video frames may be serving numerous client devices, there is a need to control an amount of time that the device dedicates to generating and providing the video frames to a particular client device.

The present disclosure provides methods, systems, and/or devices for generating and providing video frames to a client device. A device obtains a request to generate a sequence of video frames for a user interface operation being performed at a client device. The device determines that the sequence of video frames is to be presented at the client device at a first frame rate. In order to reduce an amount of time associated with generating and providing the sequence of video frames to the client device, the device generates the sequence of video frames at a second frame rate that is greater than the first frame rate. The device can transmit the sequence of video frames to the client device and instruct the client device to present the sequence of frames at the first frame rate. Since the device generates the sequence of frames at the second frame rate, the device can switch to serving another client device while the sequence of frames is being presented at the client device. The device can transmit the sequence of video frames to the client device directly or via an intermediary device such as an edge device.

FIG. 1A is a diagram that illustrates an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes various client devices 20 (e.g., a first client device 20a, a second client device 20b, a third client device 20c, . . . , and an nth client device 20n), an edge device 40, and a cloud computing platform 60. In some implementations, the edge device 40 is a part of an edge computing network (not shown).

In some implementations, the client devices 20 are coupled with respective displays. For example, in some implementations, the first client device 20a includes a dongle that is connected to a television. In some implementations, the second client device 20b is integrated into a display (e.g., a television). In some implementations, the client devices 20 present respective graphical user interfaces (GUIs) with various graphical elements (e.g., user-selectable affordances such as buttons, tiles, thumbnails, etc.). In various implementations, the client devices 20 are resource-constrained devices. For example, in some implementations, the client devices 20 do not have a suitable amount of graphics processing power to generate manipulations of graphics elements in response to detecting a user input. As such, in some implementations, when the first client device 20a detects a user input (e.g., a user selection of an affordance being displayed by the first client device 20a), the first client device 20a sends a request 22 for a sequence of video frames to the cloud computing platform 60. In some implementations, the request 22 includes an indication that the first client device 20a has detected the user input. In some implementations, the request 22 includes a user input identifier (ID) that identifies the user input. For example, if the first client device 20a is displaying a GUI with various user-selectable affordances, the request 22 may indicate which of the user-selectable affordances was selected by a user of the first client device 20a.

In various implementations, the cloud computing platform 60 includes cloud computing resources 70. In some implementations, the cloud computing resources 70 include server computers with numerous processors (e.g., general purpose processors and/or graphics processing units (GPUs)). In some implementations, the cloud computing resources 70 implement a client UI generator 80 that generates a sequence of video frames 82 ("video frames 82", hereinafter for the sake of brevity) for the first client device 20a in response to receiving the request 22. More generally, the client UI generator 80 generates video frames for the client devices 20 in response to receiving a request therefor. Although FIG. 1A illustrates a single instance of the client UI generator 80, in some implementations, the cloud computing resources 70 implement multiple instances of the client UI generator 80 in order to serve different sets of client devices 20. In some implementations, the client UI generator 80 is referred to as a UI application. In some implementations, the cloud computing resources 70 implement the client UI generator 80 by executing a set of computer-readable instructions that correspond to the client UI generator 80.

In some implementations, the cloud computing platform 60 includes a resource allocator 90 that allocates computing resources associated with the client UI generator 80 to one of the client devices 20 for a given time duration. In the example of FIG. 1A, the resource allocator 90 allocates the computing resources associated with the client UI generator 80 to the first client device 20a in response to receiving the request 22 from the first client device 20a. Although the resource allocator 90 is shown as being separate from the client UI generator 80, in some implementations, the resource allocator 90 is integrated into the client UI generator 80.

In some implementations, the cloud computing platform 60 includes an encoder 100 that outputs encoded frames 102 by encoding the video frames 82 generated by the client UI generator 80. In some implementations, the client UI generator 80 provides an encoding guidance vector 84 to the encoder 100. In some implementations, the encoding guidance vector 84 includes guidance for the encoder 100 as to how to encode the video frames 82 generated by the client UI generator 80. In various implementations, providing the encoding guidance vector 84 reduces an amount of time required to encode the video frames 82 thereby conserving computing resources associated with encoding the video frames 82. In some implementations, the encoder 100 is shared by the client devices 20. As such, reducing an amount of time required to encode the video frames 82 for the first client device 20a increases an availability of the encoder 100 for the remainder of the client devices 20. Although the encoder 100 is shown as being separate from the client UI generator 80, in some implementations, the encoder 100 is integrated into the client UI generator 80.

In various implementations, the cloud computing platform 60 (e.g., the encoder 100) transmits the encoded frames 102 (e.g., a first encoded frame 102a, a second encoded frame 102b, a third encoded frame 102c, . . . , and an nth encoded frame 102n) to the edge device 40. In some implementations, the encoded frames 102 are to be presented at the first client device 20a at a first frame rate (e.g., a frame presentation rate, for example, the frame presentation rate 264 shown in FIG. 2) and the cloud computing platform 60 generates the encoded frames 102 at a second frame rate (e.g., a frame generation rate, for example, the frame generation rate 262 shown in FIG. 2) that is greater than the first frame rate. Generating the encoded frames 102 at the second frame rate reduces an amount of time associated with generating the encoded frames 102 thereby increasing an availability of the cloud computing platform 60 to the remainder of the client devices 20.

Figure 1B:
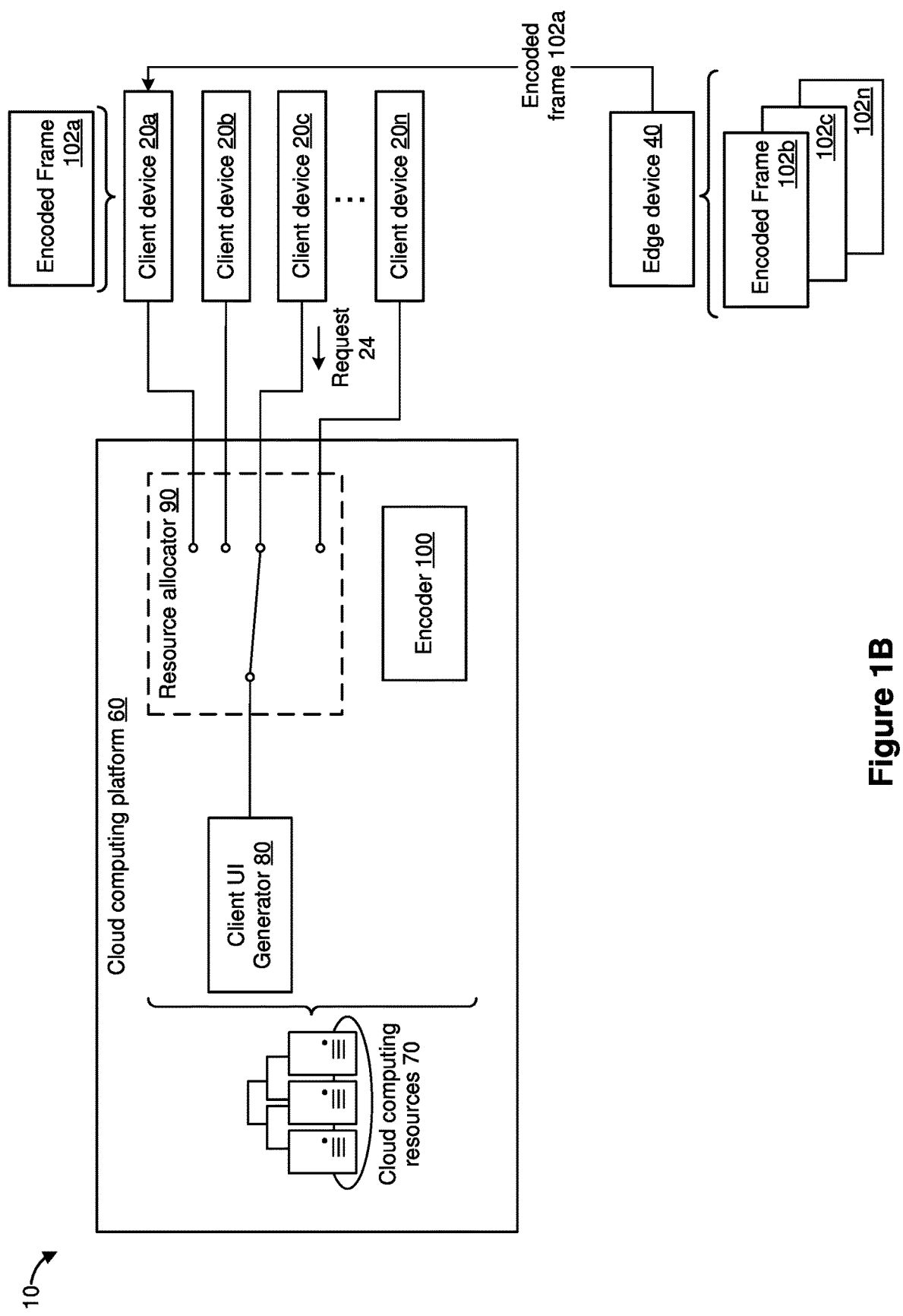

Referring to FIG. 1B, in some implementations, the cloud computing platform 60 (e.g., the client UI generator 80 and/or the encoder 100) instructs the edge device 40 to store the encoded frames 102, and to transmit the encoded frames 102 to the first client device 20a in a sequential manner at the first frame rate. As illustrated in FIG. 1B, the edge device 40 transmits the first encoded frame 102a to the first client device 20a, and the first client device 20a presents the first encoded frame 102a on a display coupled with the first client device 20a. In the example of FIG. 1B, the edge device 40 stores the second encoded frame 102b, the third encoded frame 102c, . . . , and the nth encoded frame 102n, and the cloud computing platform 60 (e.g., the client UI generator 80 and/or the encoder 100) instructs the edge device 40 to transmit the second encoded frame 102b, the third encoded frame 102c, . . . , and the nth encoded frame 102n to the first client device 20a in a sequential manner at the first frame rate.

As shown in FIG. 1B, the resource allocator 90 has allocated the computing resources associated with the client UI generator 80 and the encoder 100 to process a request 24 from the third client device 20c. In the example of FIGS. 1A and 1B, the resource allocator 90 is able to allocate the computing resources of the client UI generator 80 and the encoder 100 to the third client device 20c because the cloud computing platform 60 generated the encoded frames 102 for the first client device 20a at a frame generation rate that is greater than a frame presentation rate at which the encoded frames 102 are being presented at the first client device 20a. Advantageously, generating the encoded frames 102 for the first client device 20a at a frame generation rate that is greater than the frame presentation rate at the first client device 20a increases an availability of the cloud computing platform 60 (e.g., the client UI generator 80 and/or the encoder 100) for the remainder of the client device 20. For example, the client UI generator 80 and the encoder 100 are able to process the request 24 from the third client device 20c sooner than a scenario in which the frame generation rate was the same as the frame presentation rate.

Figure 1C:
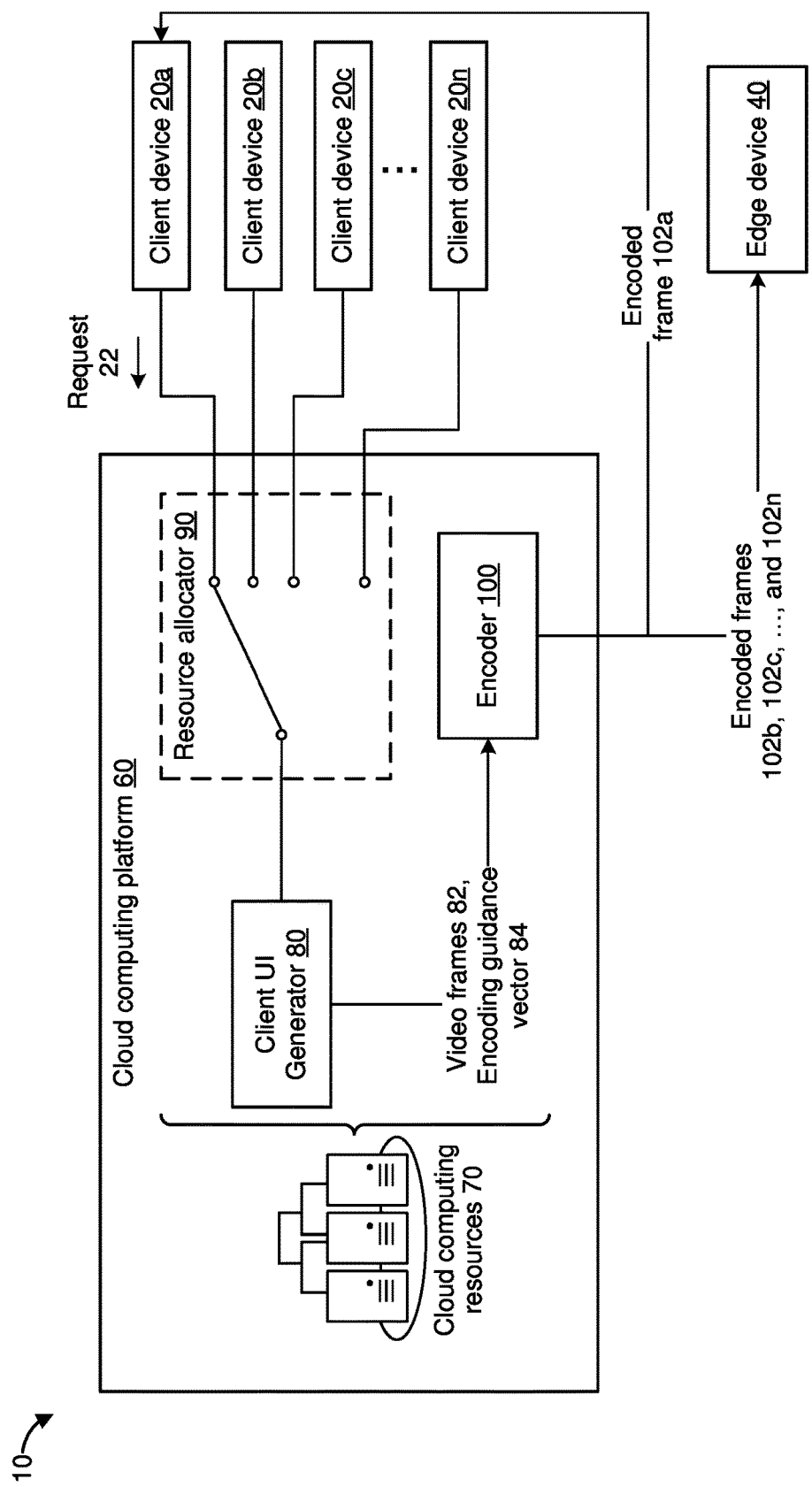

Referring to FIG. 1C, in some implementations, the cloud computing platform 60 (e.g., the encoder 100) transmits a subset of the encoded frames 102 (e.g., the first encoded frame 102a) directly to the first client device 20a, and the cloud computing platform 60 transmits a reminder of the encoded frames 102 (e.g., the second encoded frame 102b, the third encoded frame 102c, . . . , and the nth encoded frame 102n) to the edge device 40. In the example of FIG. 1C, the cloud computing platform 60 (e.g., the client UI generator 80 and/or the encoder 100) instructs the edge device 40 to transmit the remainder of the encoded frames 102 (e.g., the second encoded frame 102b, the third encoded frame 102c, . . . , and the nth encoded frame 102n) to the first client device 20a in a sequential manner at the first frame rate.

Figure 1D:
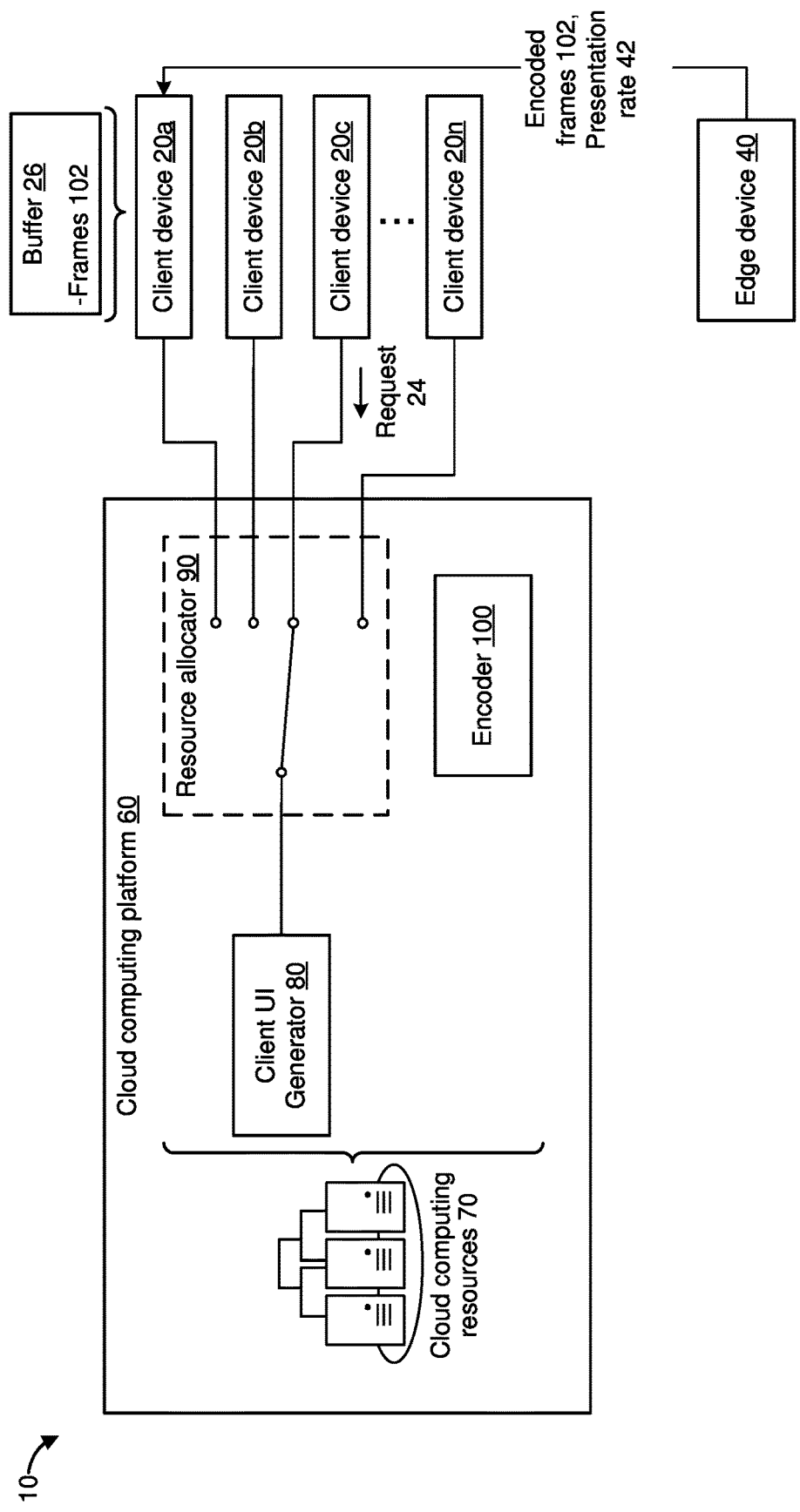

Referring to FIG. 1D, in some implementations, the first client device 20a includes a buffer 26. In some implementations, the edge device 40 transmits the encoded frames 102 to the first client device 20a concurrently (e.g., as a batch, for example, at a transmission rate that is faster than a presentation rate 42 at which the encoded frames 102 are to be presented at the first client device 20a). Additionally, the edge device 40 instructs the first client device 20a to store the encoded frames 102 in the buffer 26, and to present the encoded frames 102 in a sequential manner at the presentation rate 42.

Figure 2:
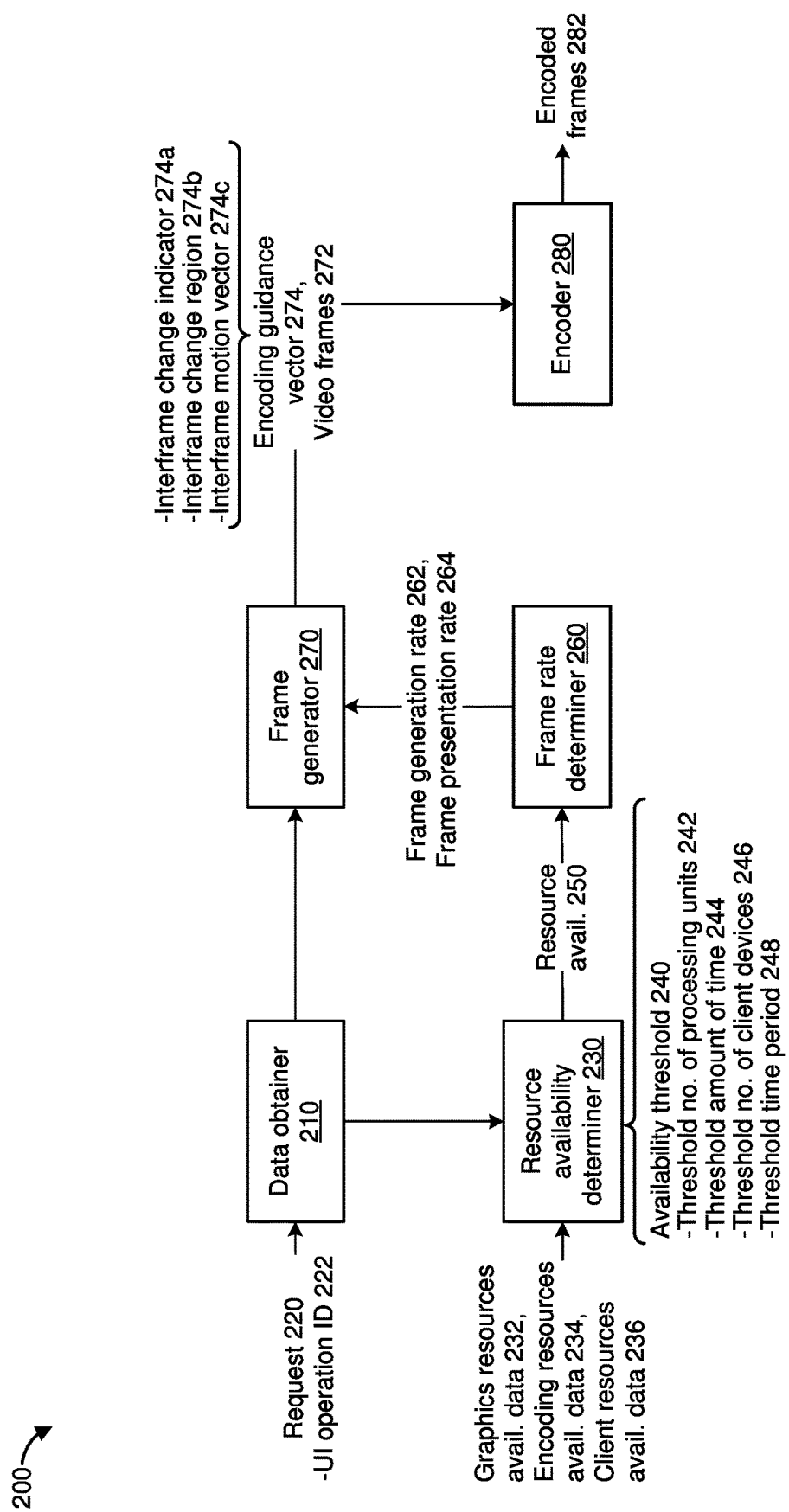
FIG. 2 is a block diagram of a frame rendering system in accordance with some implementations.

FIG. 2 illustrates a block diagram of a frame rendering system 200 ("system 200", hereinafter for the sake of brevity) in accordance with some implementations. In various implementations, the system 200 generates video frames (e.g., the encoded frames 102 shown in FIGS. 1A-1D) that correspond to a user interface operation being performed at a client device (e.g., the client devices 20 shown in FIGS. 1A-1D). To that end, in some implementations, the system 200 includes a data obtainer 210, a resource availability determiner 230, a frame rate determiner 260, a frame generator 270 and an encoder 280.

In some implementations, the system 200 is implemented by the cloud computing platform 60 (e.g., by the client UI generator 80, the resource allocator 90 and/or the encoder 100) shown in FIGS. 1A-1D. For example, in some implementations, the system 200 resides at the cloud computing platform 60 (e.g., at the client UI generator 80 and/or the encoder 100) shown in FIGS. 1A-1D. Alternatively, in some implementations, the system 200 resides at the edge device 40 shown in FIGS. 1A-1D. In some implementations, the system 200 is distributed across the cloud computing platform 60 and the edge device 40. For example, some components of the system 200 are implemented by the cloud computing platform 60 while a remainder of the components of the system 200 are implemented by the edge device 40.

In various implementations, the data obtainer 210 obtains (e.g., receives) a request 220 to provide a sequence of video frames that corresponds to a user interface operation being performed at a client device (e.g., the first client device 20a shown in FIGS. 1A-1D). In some implementations, the request 220 includes a user interface operation identifier (ID) 222 that identifies the user interface operation that is being performed at the client device. In some implementations, the client device is presenting a graphical user interface (GUI) with various affordances (e.g., buttons, tiles, thumbnails, etc.), and the user interface operation includes a user selection of one of the affordances included in the GUI. In some implementations, the user interface operation includes a user request to navigate within different portions of the GUI (e.g., a scroll operation, for example, scrolling between selectable thumbnails that correspond to different media content items). In some implementations, the data obtainer 210 provides the user interface operation ID 222 to the resource availability determiner 230 and the frame generator 270.

In some implementations, the resource availability determiner 230 determines an availability of computing resources 250 ("resource availability 250", hereinafter for the sake of brevity) associated with providing (e.g., generating and/or encoding) a sequence of video frames that corresponds to the user interface operation ID 222. In some implementations, the resource availability determiner 230 obtains resource availability data that indicates an amount of computing resources that is available, and the resource availability determiner 230 determines the resource availability 250 based on the resource availability data. In some implementations, the resource availability determiner 230 receives the resource availability data. Alternatively, in some implementations, the resource availability determiner 230 determines the resource availability data by monitoring a utilization of computing resources.

In some implementations, the resource availability 250 indicates whether or not the amount of computing resources that is available satisfies (e.g., exceeds) an availability threshold 240. In some implementations, the resource availability 250 indicates whether or not a number of available processing units is greater than a threshold number of processing units 242. In some implementations, the resource availability 250 indicates whether or not an amount of available compute time is greater than a threshold amount of time 244. In some implementations, the resource availability 250 indicates whether or not a number of client devices that the system 200 is expected to serve over a period of time (e.g., within the next five minutes) is less than a threshold number of client devices 246. In some implementations, the resource availability 250 indicates whether a current time is within a threshold time period 248 that corresponds to an accelerated frame generation rate (e.g., whether the current time is within off-peak hours or peak hours for user interface operations at client devices).

In some implementations, the resource availability determiner 230 obtains graphics resources availability data 232 that indicates an availability of computing resources associated with generating video frames (e.g., an availability of graphics processing units (GPUs)). For example, in some implementations, the graphics resources availability data 232 indicates an availability of the client UI generator 80 shown in FIGS. 1A-1D. In some implementations, the graphics resources availability data 232 indicates an availability of the frame generator 270. In some implementations, the client UI generator 80 and/or the frame generator 270 provide the graphics resources availability data 232. In some implementations, the graphics resources availability data 232 indicates a number of processing units (e.g., a number of graphics generation units, for example, a number of GPUs) that are available for generating video frames, and the resource availability 250 indicates whether or not the number of processing units is greater than the threshold number of processing units 242. In some implementations, the graphics resources availability data 232 indicates an amount of compute time that is available for generating video frames, and the resource availability 250 indicates whether or not the amount of compute time is greater than the threshold amount of time 244. In some implementations, the graphics resources availability data 232 indicates a number of client devices that are expected to generate requests for video frames over a period of time, and the resource availability 250 indicates whether or not the number of client devices is less than the threshold number of client devices.

In some implementations, the resource availability determiner 230 obtains encoding resources availability data 234 that indicates an availability of computing resources associated with encoding video frames (e.g., an availability of encoding units, for example, an availability of encoders). For example, in some implementations, the encoding resources availability data 234 indicates an availability of the encoder 100 shown in FIGS. 1A-1D. In some implementations, the encoding resources availability data 234 indicates an availability of the encoder 280. In some implementations, the encoder 100 and/or the encoder 280 provide the encoding resources availability data 234. In some implementations, the encoding resources availability data 234 indicates a number of processing units (e.g., a number of encoding units) that are available for encoding video frames, and the resource availability 250 indicates whether or not the number of processing units is greater than the threshold number of processing units 242. In some implementations, the encoding resources availability data 234 indicates an amount of compute time that is available for encoding video frames, and the resource availability 250 indicates whether or not the amount of compute time is greater than the threshold amount of time 244. In some implementations, the encoding resources availability data 234 indicates a number of client devices that are expected to generate requests for video frames over a period of time, and the resource availability 250 indicates whether or not the number of client devices is less than the threshold number of client devices.

In some implementations, the resource availability determiner 230 obtains client resources availability data 236 that indicates an availability of computing resources associated with a client device that provided the request 220 (e.g., the first client device 20a shown in FIGS. 1A-1D). In some implementations, the client resources availability data 236 indicates an amount of bandwidth that is available to the client device. In some implementations, the resource availability 250 indicates whether or not the amount of bandwidth that is available to the client device is greater than a threshold amount of bandwidth. In some implementations, the client resources availability data 236 indicates an amount of processing power that is available to the client device. In some implementations, the resource availability 250 indicates whether or not the amount of processing power that is available to the client device is greater than a threshold amount of processing power. In some implementations, the client resources availability data 236 indicates a frame rate at which the client device can present the sequence of video frames (e.g., a frame presentation rate, for example, the frame presentation rate 264). In some implementations, the client device provides the client resource availability data 236. Alternatively, in some implementations, the system 200 (e.g., the resource availability determiner 230) determines the client resources availability data 236, for example, by monitoring network conditions (e.g., by monitoring a communication link to the client device).

In various implementations, the frame rate determiner 260 determines a frame generation rate 262 for generating the sequence of video frames based on the resource availability 250. In some implementations, the frame rate determiner 260 determines, based on the resource availability 250, a frame presentation rate 264 for presenting the sequence of video frames at the client device that provided the request 220. In some implementations, the frame generation rate 262 is greater than the frame presentation rate 264. In some implementations, the frame generation rate 262 is a multiple of the frame presentation rate 264 (e.g., the frame generation rate 262 is two times, four times, ten times, twenty times or hundred times faster than the frame presentation rate 264).

In various implementations, the frame generation rate 262 is greater than the frame presentation rate 264 when the resource availability 250 for generating and/or encoding the sequence of video frames is greater than the availability threshold 240. For example, in some implementations, the frame generation rate 262 is faster than the frame presentation rate 264 when the graphics resources availability data 232 indicates that a number of graphics processing units available for generating the sequence of video frames is greater than the threshold number of processing units 242 and the encoding resources availability data 234 indicates that a number of encoding units available for encoding the sequence of video frames is greater than the threshold number of processing units 242.

In some implementations, the frame generation rate 262 is greater than the frame presentation rate 264 when increasing the frame generation rate 262 does not have an adverse impact on generating frames for other client devices. For example, in some implementations, the frame generation rate 262 is greater than the frame presentation rate 264 when the resource availability data indicates that a number of client devices that are expected to provide requests for video frames is less than the threshold number of client devices 246. Additionally or alternatively, in some implementations, the frame generation rate 262 is greater than the frame presentation rate 264 when a current time is within a threshold time period 248 when less than the threshold number of client devices 246 are expected to provide requests for video frames (e.g., the current time is between 2 pm and 4 pm when a relatively small number of client devices are expected to provide requests for video frames).

In some implementations, the frame rate determiner 260 sets the frame generation rate 262 to be the same as (e.g., equal to or within a similarity threshold of) the frame presentation rate 264 in response to the resource availability 250 breaching the availability threshold 240 (e.g., in response to the resource availability 250 being less than the availability threshold 240). For example, in some implementations, the frame rate determiner 260 sets the frame generation rate 262 to be the same as the frame presentation rate 264 in response to the graphics resources availability data 232 indicating that a number of graphics processing units available for generating video frames is less than the threshold number of processing units 242 and/or in response to the encoding resources availability data 234 indicating that a number of encoding units available for encoding video frames is less than the threshold number of processing units 242.

In some implementations, the frame rate determiner 260 sets the frame generation rate 262 to be the same as the frame presentation rate 264 in response to the resource availability data indicating that a number of client devices that are expected to request video frames over a period of time is greater than the threshold number of client devices 246. In some implementations, the frame rate determiner 260 sets the frame generation rate 262 to be the same as the frame presentation rate 264 in response to a current time being outside the threshold time period 248. For example, in some implementations, the frame rate determiner 260 sets the frame generation rate 262 to be the same as the frame presentation rate 264 in response to the current time being within a time window that corresponds to a peak content viewing time (e.g., between 6 pm and 10 pm when many client devices are expected to provide requests for video frames).

In some implementations, the frame rate determiner 260 determines the frame presentation rate 264 based on the resource availability data. In some implementations, the frame rate determiner 260 determines the frame presentation rate 264 based on the client resources availability data 236. For example, in some implementations, the frame presentation rate 264 is a function of (e.g., proportional to) an amount of bandwidth that is available to the client device. In some implementations, the frame rate determiner 260 determines the frame presentation rate 264 based on the graphics resources availability data 232 and/or the encoding resources availability data 234. For example, if the availability of graphics generation resources and/or encoding resources is less than the availability threshold 240, the frame rate determiner 260 selects a relatively low frame presentation rate 264. In some implementations, the frame rate determiner 260 determines the frame presentation rate 264 based on the user interface operation ID 222. For example, in some implementations, the frame presentation rate 264 is a function of a complexity of an animation associated with the user interface operation ID 222.

In various implementations, the frame generator 270 generates a sequence of video frames 272 ("video frames 272", hereinafter for the sake of brevity) at the frame generation rate 262 (e.g., the frame generator 270 generates the video frames 82 shown in FIG. 1A). In some implementations, the frame generator 270 utilizes graphics processing units to generate the video frames 272. In various implementations, the video frames 272 collectively illustrate a manipulation of graphical elements of a GUI in response to a user interface operation indicated by the user interface operation ID 222. For example, if the user interface operation ID 222 corresponds to a scroll operation, the video frames 272 illustrate graphical elements being scrolled in response to the scroll operation. In various implementations, the frame generator 270 provides the video frames 272 to the encoder 280 for encoding, and the encoder 280 generates encoded frames 282 (e.g., the encoded frames 102 shown in FIGS. 1A-1D).

In some implementations, the frame generator 270 provides an encoding guidance vector 274 to the encoder 280. In some implementations, the encoding guidance vector 274 provides guidance to the encoder 280 for encoding the video frames 272. In some implementations, the encoding guidance vector 274 reduces an amount of time associated with encoding the video frames 272. In some implementations, the encoding guidance vector 274 includes an interframe change indicator 274a that indicates whether or not there is a difference between two successive frames in the sequence of video frames 272. In some implementations, if the interframe change indicator 274a indicates that there is no difference between a first one of the video frames 272 and a second one of the video frames 272, the encoder 280 forgoes analyzing the second one of the video frames 272 because the second one of the video frames 272 is identical to the first one of the video frames 272. In some implementations, the encoder 280 replaces the second one of the video frames 272 with a null frame. In some implementations, if the interframe change indicator 274a indicates that there is a difference between the first one of the video frames 272 and the second one of the video frames 272, the encoder 280 analyzes the second one of the video frames 272.

In some implementations, the encoding guidance vector 274 indicates an interframe change region 274b that specifies a particular region between two successive frames that has changed. In some implementations, the encoder 280 analyzes a first one of the video frames 272, and a particular region of a second one of the video frames 272 that succeeds the first one of the video frames 272. In some implementations, the encoder 280 forgoes analyzing a remainder of the second one of the video frames 272 because the remainder of the second one of the video frames 272 has not changed relative to the first one of the video frames 272. By focusing on the particular region indicated by the interframe change region 272b and not analyzing the remainder of a video frame 272, the encoder 280 conserves encoding resources and reduces an amount of time associated with encoding the video frames 272.

In some implementations, the encoding guidance vector 274 includes an interframe motion vector 274c that indicates a movement of a block (e.g., a group of pixels) across a subset of the video frames 272. For example, in some implementations, the interframe motion vector 274c indicates that a particular block has moved from a first location in a first one of the video frames 272 to a second location in a second one of the video frames 272. In some implementations, the encoder 280 forgoes performing block-by-block movement analysis, and utilizes the interframe motion vector 274c to determine changes between two or more of the video frames 272. As such, in some implementations, the interframe motion vector 274c reduces an amount of time required to generate the encoded frames 282.

Figure 3:
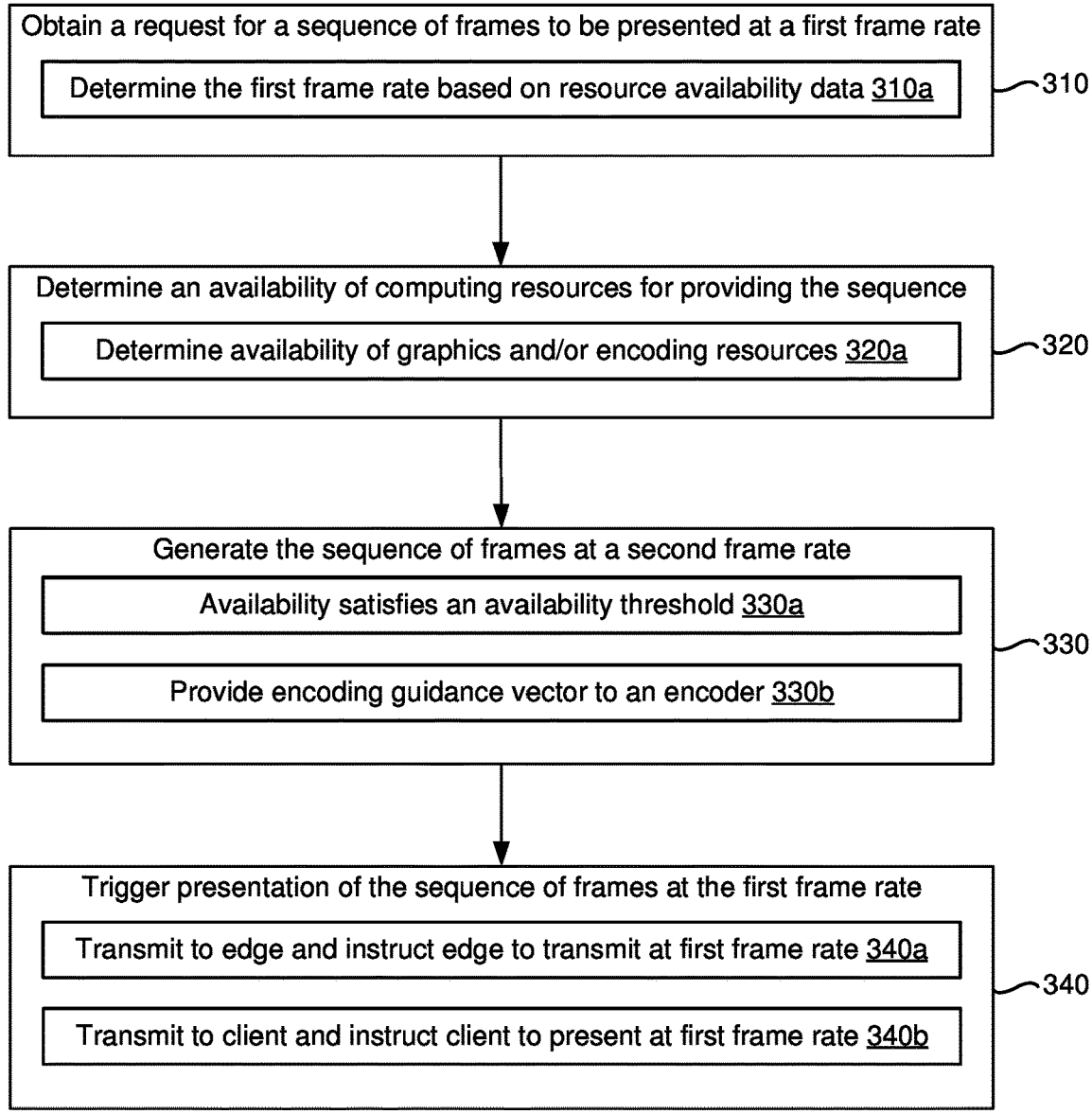
FIG. 3 is a flowchart representation of a method of generating a sequence of videos frames in accordance with some implementations.

FIG. 3 is a flowchart representation of a method 300 for generating a sequence of videos frames for a user interface operation being performed at a client device. In various implementations, the method 300 is performed by a device (e.g., by the edge device 40 and/or by the cloud computing platform 60, for example, by the client UI generator 80 and/or the encoder 100 shown in FIGS. 1A-1D, and/or the system 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes obtaining a request for a sequence of video frames that corresponds to a user interface operation being performed at a client device. For example, as shown in FIG. 1A, the cloud computing platform 60 receives the request 22 from the first client device 20a. As another example, as shown in FIG. 2, the data obtainer 210 receives the request 220. In some implementations, the sequence of video frames is to be presented at the client device at a first frame rate. For example, as shown in FIG. 2, the encoded frames 282 are to be presented at a client device that generated the request 220 at the frame presentation rate 264.

As represented by block 310a, in some implementations, the method 300 includes determining the first frame rate based on client resource availability data that indicates an amount of resources that are available to the client device. For example, in some implementations, the method 300 includes determining the first frame rate based on an amount of bandwidth that is available to the client device. For example, as shown in FIG. 2, in some implementations, the frame rate determiner 260 determines the frame presentation rate 264 based on the client resources availability data 236.

In some implementations, the method 300 includes determining the first frame rate based on the availability of computing resources associated with providing the sequence of video frames to the client device. For example, as described in relation to FIG. 2, in some implementations, the frame rate determiner 260 determines the frame presentation rate 264 based on the resource availability 250 that is a function of the graphics resources availability data 232 and/or the encoding resources availability data 234.

As represented by block 320, in some implementations, the method 300 includes determining an availability of computing resources (e.g., an expected availability of computing resources) associated with providing the sequence of video frames to the client device. For example, as shown in FIG. 2, in some implementations, the resource availability determiner 230 determines the resource availability 250 based on resource availability data (e.g., the graphics resources availability data 232, the encoding resources availability data 234 and/or the client resources availability data 236).

As represented by block 320a, in some implementations, determining the availability of computing resources includes determining an availability of graphics generation resources associated with generating the sequence of video frames. For example, as shown in FIG. 2, in some implementations, the resource availability determiner 230 determines the resource availability 250 based on the graphics resources availability data 232. In some implementations, determining the availability of computing resources includes determining an availability of encoding resources associated with encoding the sequence of video frames. For example, as shown in FIG. 2, in some implementations, the resource availability determiner 230 determines the resource availability 250 based on the encoding resources availability data 234. In some implementations, the method 300 includes setting the availability of computing resources to a smaller of the availability of the graphics generation resources and the availability of the encoding resources.

As represented by block 330, in some implementations, the method 300 includes generating, based on the availability of computing resources, the sequence of video frames at a second frame rate that is greater than the first frame rate. For example, as shown in FIG. 2, the frame rate determiner 260 determines the frame generation rate 262 based on the resource availability 250, and the frame generator 270 generates the video frames 272 at the frame generation rate 262.

As represented by block 330a, in some implementations, the method 300 includes generating the sequence of video frames at the second frame rate in response to the availability of computing resources satisfying an availability threshold associated with the second frame rate. For example, as described in relation to FIG. 2, in some implementations, the frame rate determiner 260 sets a value of the frame generation rate 262 to be greater than a value of the frame presentation rate 264 in response to the resource availability 250 being greater than the availability threshold 240.

In implementations, determining the availability of computing resources includes determining a number of available processing units (e.g., a number of graphics generation units for generating the sequence of video frames, and/or a number of encoding units for encoding the sequence of video frames). In some implementations, the method 300 includes generating the sequence of video frames at the second frame rate in response to the number of available processing units being greater than a threshold number of processing units. For example, as described in relation to FIG. 2, in some implementations, the frame rate determiner 260 sets a value of the frame generation rate 262 to be greater than a value of the frame presentation rate 264 in response to the resource availability 250 indicating that a number of available graphics processing units is greater than the threshold number of processing units 242 and/or that a number of encoding units is greater than the threshold number of processing units 242.

In some implementations, determining the availability of computing resources includes determining an amount of available compute time (e.g., graphics processing time for generating the sequence of video frames, and/or encoding time for encoding the sequence of video frames). In some implementations, the method 300 includes generating the sequence of video frames at the second frame rate in response to the amount of available compute time being greater than a threshold amount of time. For example, as described in relation to FIG. 2, in some implementations, the frame rate determiner 260 sets a value of the frame generation rate 262 to be greater than a value of the frame presentation rate 264 in response to the resource availability 250 indicating that an amount of available compute time is greater than the threshold amount of time 244.

In some implementations, determining the availability of computing resources includes determining a number of client devices that are expected to request respective sequences of video frames for corresponding user interface operations. In some implementations, the method 300 includes generating the sequence of video frames at the second frame rate in response to the number of client devices that are expected to request respective sequences of video frames being less than a threshold number of client devices. For example, as described in relation to FIG. 2, in some implementations, the frame rate determiner 260 sets a value of the frame generation rate 262 to be greater than a value of the frame presentation rate 264 in response to the resource availability 250 indicating that a number of client devices that are expected to request video frames over a period of time (e.g., over the next five minutes) is less than the threshold number of client devices 246 (e.g., less than ten percent of the client devices 20 connected to the cloud computing platform 60 shown in FIGS. 1A-1D).

In some implementations, the availability of computing resources is a function of a time of day. For example, the availability of computing resources for generating video frames for user interface operations may be relatively low at 6 pm when a relatively large number of client devices (e.g., more than 50% of client devices) are expected to navigate user interfaces. By contrast, the availability of computing resources for generating video frames for user interface operations may be relatively high at 9 pm when a relatively small number of client devices (e.g., less than 10% of client devices) are expected to present media content items and not navigate user interfaces. In some implementations, the method 300 includes generating the sequence of video frames at the second frame rate in response to a current time being within a time period that corresponds to the second frame rate. For example, the frame rate determiner 260 may set a value of the frame generation rate 262 to be greater than a value of the frame presentation rate 264 during off-peak hours (e.g., during hours when users of client devices are not expected to navigate their respective user interfaces, for example, before 6 pm). In this example, the frame rate determiner 260 may set the value of the frame generation rate 262 to be equal to the value of the frame presentation rate 264 during peak hours (e.g., during hours when users of client devices are expected to navigate their respective user interfaces, for example between 6 pm and 9 pm).

In some implementations, the method 300 includes selecting a value for the second frame rate based on an amount of availability of computing resources. In some implementations, the value of the second frame rate is proportional to the amount of available computing resources. For example, if the amount of available computing resources is greater than a first threshold amount, the method 300 includes selecting a first value for the second frame rate (e.g., set the second frame rate to two times the first frame rate). In this example, if the amount of available computing resources is greater than a second threshold amount that is greater than the first threshold amount, the method 300 includes selecting a second value for the second frame rate that is greater than the first value (e.g., set the second frame rate to ten times the first frame rate).

As represented by block 330*b*, in some implementations, the method 300 includes providing, to an encoder, the sequence of video frames and an encoding guidance vector that provides encoding guidance to the encoder in order to allow the encoder to encode the sequence of video frames within a threshold amount of time. For example, as shown in FIG. 1A, the client UI generator 80 provides an encoding guidance vector 84 to the encoder 100 that allows the encoder 100 to generate the encoded frames 102 in a reduced amount of time. As another example, as shown in FIG. 2, the frame generator 270 provides the encoding guidance vector 274 to the encoder 280 thereby allowing the encoder 280 to encode the video frames 272 and generate the encoded frames 282 in a reduced amount of time.

In some implementations, the encoding guidance vector indicates that there is no change between a first video frame and a second video frame that appear in succession in the sequence of video frames in order to allow the encoder to conserve encoding resources by forgoing analysis of the second video frame. For example, as shown in FIG. 2, in some implementations, the encoding guidance vector 274 includes an interframe change indicator 274*a* that indicates whether or not there is a difference between two successive video frames 272. In some implementations, the method 300 includes replacing the second video frame with a null frame. For example, as described in relation to FIG. 2, the encoder 280 may transmit a null frame instead of the second video frame. In some implementations, the encoder forgoes encoding a frame that is identical to a previous frame thereby conserving encoding resources.

In some implementations, the encoding guidance vector indicates an area (e.g., a 'dirty' polygon, for example, a 'dirty' rectangle) within which to detect changes between a first video frame and a second video frame that appear in succession in the sequence of video frames. For example, as shown in FIG. 2, in some implementations, the encoding guidance vector 274 indicates an interframe change region 274*b* that identifies a particular region within which the encoder 280 is to detect changes between two successive frames. In some implementations, the encoder forgoes detecting changes in other regions thereby conserving encoding resources.

In some implementations, the encoding guidance vector includes a motion vector that indicates a movement of a block between a first video frame and a second video frame that appear in succession in the sequence of video frames. For example, as shown in FIG. 2, in some implementations, the encoding guidance vector 274 includes an interframe motion vector 274*c* that indicates a movement of a block (e.g., a group of pixels) between successive frames. As such, the encoder conserves encoding resources by forgoing block-by-block analysis in order to track movement of blocks across successive frames.

As represented by block 340, in some implementations, the method 300 includes triggering the client device to present the sequence of video frames at the first frame rate. As represented by block 340*a*, in some implementations, the method 300 includes transmitting the sequence of video frames to an edge device, and instructing the edge device to transmit the sequence of video frames to the client device in a sequential manner at the first frame rate. For example, as shown in FIGS. 1A and 1B, the cloud computing platform 60 transmits the encoded frames 102 to the edge device 40, and the cloud computing platform 60 instructs the edge device 40 to transmit the encoded frames 102 to the first client device 20*a* in a sequential manner at the first frame rate (e.g., at the frame presentation rate 264 shown in FIG. 2).

As represented by block 340*b*, in some implementations, the method 300 includes transmitting the sequence of video frames to the client device (e.g., via an intermediary device such as the edge device 40 shown in FIGS. 1A-1D, or without the intermediary device, for example, directly from the cloud computing platform 60 to the first client device 20*a*). In some implementations, the method 300 includes instructing the client device to present the sequence of video frames at the first frame rate. For example, as shown in FIG. 1D, the edge device 40 transmits the encoded frames 102 to the client device 20*a* as a batch (e.g., concurrently, for example, at a transmission rate that is faster than the presentation rate 42), and the edge device 40 instructs the first client device 20*a* to store the encoded frames 102 in the buffer 26 and to present the encoded frames 102 in a sequential manner at the presentation rate 42.

Figure 4:
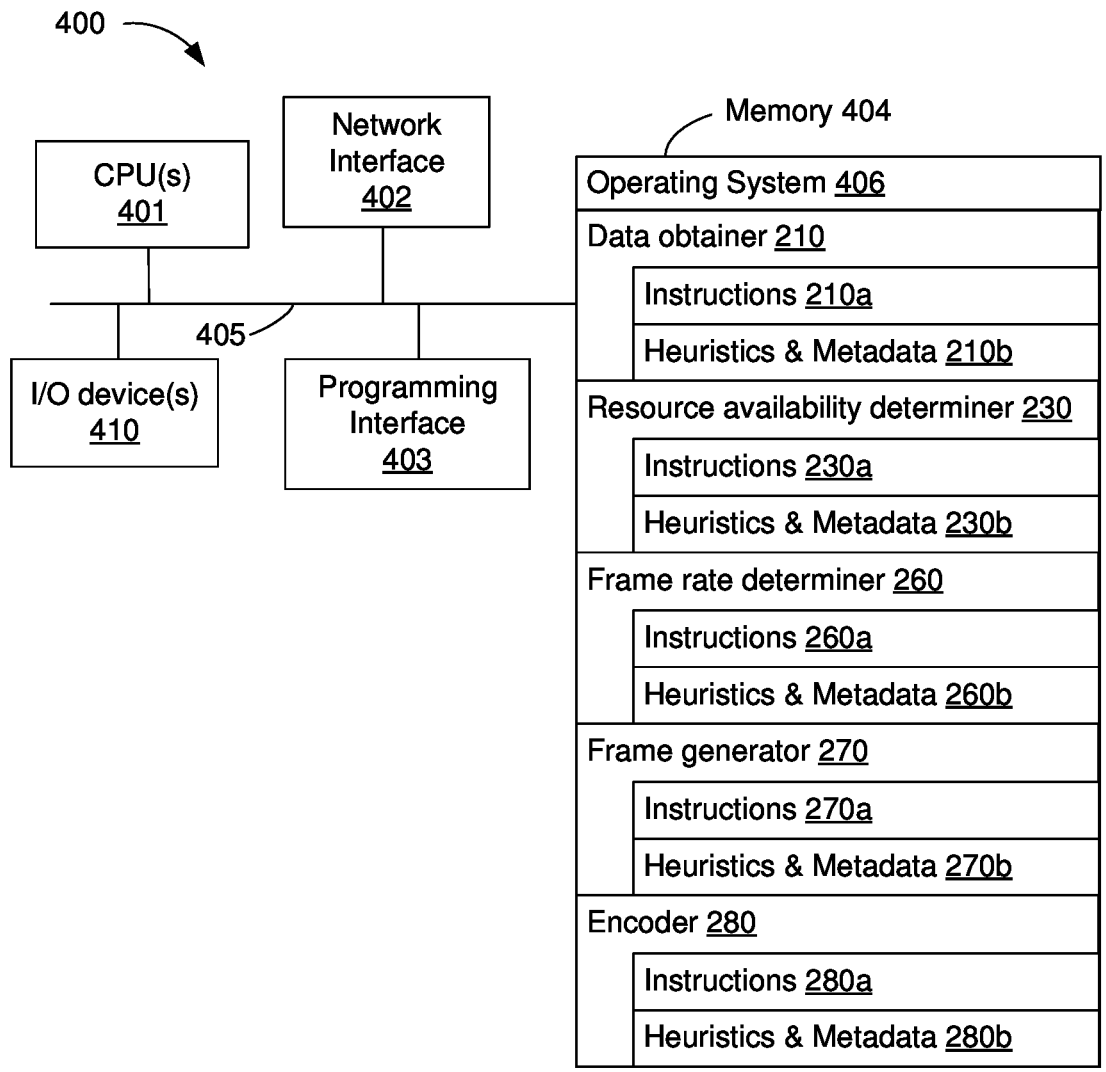
FIG. 4 is a block diagram of a device that generates a sequence of video frames for a client device in accordance with some implementations.

FIG. 4 is a block diagram of a device 400 in accordance with some implementations. In some implementations, the device 400 implements the cloud computing platform 60 (e.g., a combination of the client UI generator 80, the resource allocator 90 and the encoder 100) and/or the edge device 40 shown in FIGS. 1A-1D, and/or the system 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 210, the resource availability determiner 230, the frame rate determiner 260, the frame generator 270, and the encoder 280. In various implementations, the device 400 performs the method 300 shown in FIG. 3.

In some implementations, the data obtainer 210 includes instructions 210a, and heuristics and metadata 210b for obtaining a request to generate a sequence of video frames for a user interface operation being performed at a client device. In some implementations, the data obtainer 210 performs at least some of the operation(s) represented by block 310 in FIG. 3.

In some implementations, the resource availability determiner 230 includes instructions 230a, and heuristics and metadata 230b for determining an availability of computing resources associated with providing the sequence of video frames to the client device. In some implementations, the resource availability determiner 230 performs at least some of the operation(s) represented by block 320 in FIG. 3.

In some implementations, the frame rate determiner 260 includes instructions 260a, and heuristics and metadata 260b for determining a frame generation rate for generating the video frames and/or a frame presentation rate for presenting the video frames. In some implementations, the frame rate determiner 260 performs at least some of the operation(s) represented by block 330 in FIG. 3.

In some implementations, the frame generator 270 includes instructions 270a, and heuristics and metadata 270b for generating the sequence of video frames at the frame generation rate determined by the frame rate determiner 260. In some implementations, the frame generator 270 performs at least some of the operation(s) represented by blocks 330 and 340 in FIG. 3.

In some implementations, the encoder 280 includes instructions 280a, and heuristics and metadata 280b for encoding the sequence of video frames. In some implementations, the encoder 280 performs at least some of the operation(s) represented by block 330 in FIG. 3.

In some implementations, the one or more I/O devices 410 include a receiver for receiving the request and a transmitter for transmitting the sequence of video frames.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
at a first device including a non-transitory memory and one or more processors:
obtaining a request for a sequence of video frames that corresponds to a user interface operation being performed at a client device that is different from the first device, wherein the sequence of video frames is to be presented at the client device at a first frame rate;
determining an availability of computing resources at the first device associated with generating the sequence of video frames for the client device;
in response to the availability of computing resources associated with generating the sequence of video frames being greater than a threshold amount of computing resources, generating the sequence of video frames at a second frame rate that is greater than the first frame rate; and
triggering the client device to present the sequence of video frames at the first frame rate.

2. The method of claim 1, wherein determining the availability of computing resources comprises determining a number of available processing units; and
wherein generating the sequence of video frames at the second frame rate comprises generating the sequence of video frames at the second frame rate in response to the number of available processing units being greater than a threshold number of processing units.

3. The method of claim 1, wherein determining the availability of computing resources comprises determining an amount of available compute time; and
wherein generating the sequence of video frames comprises generating the sequence of video frames at the second frame rate in response to the amount of available compute time being greater than a threshold amount of time.

4. The method of claim 1, wherein determining the availability of computing resources comprises determining a number of client devices that are expected to request respective sequences of video frames for corresponding user interface operations; and
wherein generating the sequence of video frames comprises generating the sequence of video frames at the second frame rate in response to the number of client devices that are expected to request respective sequences of video frames being less than a threshold number of client devices.

5. The method of claim 1, wherein the availability of computing resources is a function of a time of day; and
wherein generating the sequence of video frames comprises generating the sequence of video frames at the second frame rate in response to a current time being within a time period that corresponds to the second frame rate.

6. The method of claim 1, further comprising:
providing, to an encoder, the sequence of video frames and an encoding guidance vector that provides encoding guidance to the encoder in order to allow the encoder to encode the sequence of video frames within a threshold amount of time.

7. The method of claim 6, wherein the encoding guidance vector indicates that there is no change between a first video frame and a second video frame that appear in succession in the sequence of video frames in order to allow the encoder to conserve encoding resources by forgoing analysis of the second video frame.

8. The method of claim 7, further comprising replacing the second video frame with a null frame.

9. The method of claim 6, wherein the encoding guidance vector indicates an area within which to detect changes between a first video frame and a second video frame that appear in succession in the sequence of video frames.

10. The method of claim 6, wherein the encoding guidance vector includes a motion vector that indicates a movement of a block between a first video frame and a second video frame that appear in succession in the sequence of video frames.

11. The method of claim 1, further comprising determining the first frame rate based on client resource availability data that indicates an amount of resources that are available to the client device.

12. The method of claim 1, further comprising determining the first frame rate based on an availability of computing resources associated with transmitting the sequence of video frames to the client device.

13. The method of claim 1, wherein the determining the availability of computing resources comprises determining an availability of graphics generation resources associated with generating the sequence of video frames.

14. The method of claim 1, wherein the determining the availability of computing resources comprises determining an availability of encoding resources associated with encoding the sequence of video frames.

15. The method of claim 1, wherein triggering the client device to present the sequence of video frames at the first frame rate comprises:
transmitting the sequence of video frames to an edge device; and
instructing the edge device to transmit the sequence of video frames to the client device in a sequential manner at the first frame rate.

16. The method of claim 1, wherein triggering the client device to present the sequence of video frames at the first frame rate comprises:
transmitting the sequence of video frames to the client device; and
instructing the client device to present the sequence of video frames at the first frame rate.

17. A first device comprising:
one or more processors;
a non-transitory memory; and
one or more programs stored in the non-transitory memory, which, when executed by the one or more processors, cause the first device to:
obtain a request for a sequence of video frames that corresponds to a user interface operation being performed at a client device that is different from the first device, wherein the sequence of video frames is to be presented at the client device at a first frame rate;
determine an availability of computing resources at the first device associated with generating the sequence of video frames for the client device;
in response to the availability of computing resources associated with generating the sequence of video frames being greater than a threshold amount of computing resources, generate the sequence of video frames at a second frame rate that is greater than the first frame rate; and
trigger the client device to present the sequence of video frames at the first frame rate.

18. The first device of claim 17, wherein determining the availability of computing resources comprises determining a number of available processing units; and
wherein generating the sequence of video frames at the second frame rate comprises generating the sequence of video frames at the second frame rate in response to the number of available processing units being greater than a threshold number of processing units.

19. A non-transitory memory storing one or more programs, which, when executed by one or more processors of a first device, cause the first device to:
obtain a request for a sequence of video frames that corresponds to a user interface operation being performed at a client device that is different from the first device, wherein the sequence of video frames is to be presented at the client device at a first frame rate;
determine an availability of computing resources at the first device associated with generating the sequence of video frames for the client device;
in response to the availability of computing resources associated with generating the sequence of video frames being greater than a threshold amount of computing resources, generate the sequence of video frames at a second frame rate that is greater than the first frame rate; and
trigger the client device to present the sequence of video frames at the first frame rate.

20. The non-transitory memory of claim 19, wherein determining the availability of computing resources comprises determining a number of client devices that are expected to request respective sequences of video frames for corresponding user interface operations; and
wherein generating the sequence of video frames comprises generating the sequence of video frames at the second frame rate in response to the number of client devices that are expected to request respective sequences of video frames being less than a threshold number of client devices.

* * * * *